United States Patent
Kupfer et al.

(10) Patent No.: US 10,994,621 B2
(45) Date of Patent: May 4, 2021

(54) MOTOR VEHICLE WITH AN ELECTRIC DRIVE, HV ALTERNATIVE ENERGY STORAGE DEVICE, AND SYSTEM

(71) Applicant: AUDI AG, Ingolstadt (DE)

(72) Inventors: Alexander Kupfer, Mannheim (DE); Philipp Renner, Munich (DE)

(73) Assignee: AUDI AG, Ingolstadt (DE)

( * ) Notice: Subject to any disclaimer, the term of this patent is extended or adjusted under 35 U.S.C. 154(b) by 36 days.

(21) Appl. No.: 16/519,465

(22) Filed: Jul. 23, 2019

(65) Prior Publication Data

US 2020/0047631 A1 Feb. 13, 2020

(30) Foreign Application Priority Data

Aug. 10, 2018 (DE) .......................... 102018213542.8

(51) Int. Cl.
*B60L 50/60* (2019.01)
*B60L 50/64* (2019.01)
*B60L 53/80* (2019.01)
*H01M 10/613* (2014.01)
*H01M 10/625* (2014.01)
*H01M 2/10* (2006.01)
*B60L 58/26* (2019.01)
*H01M 50/20* (2021.01)

(52) U.S. Cl.
CPC .............. *B60L 50/66* (2019.02); *B60L 50/64* (2019.02); *B60L 53/80* (2019.02); *B60L 58/26* (2019.02); *H01M 10/613* (2015.04); *H01M 10/625* (2015.04); *H01M 50/20* (2021.01); *B60L 2210/10* (2013.01); *H01M 2220/20* (2013.01)

(58) Field of Classification Search
USPC ................................................. 307/10.1, 9.1
See application file for complete search history.

(56) References Cited

U.S. PATENT DOCUMENTS

| 2009/0015202 A1* | 1/2009 | Miura | B60W 20/00 320/132 |
| 2014/0217991 A1* | 8/2014 | Wisniewski | B60L 53/14 320/137 |
| 2016/0126878 A1* | 5/2016 | Schuster | H02P 27/04 318/504 |

FOREIGN PATENT DOCUMENTS

| DE | 102009007422 A1 | 8/2010 |
| DE | 102014100957 A1 | 8/2014 |
| DE | 102014208186 A1 | 11/2015 |

(Continued)

OTHER PUBLICATIONS

German Search Report dated Mar. 19, 2019 in corresponding German Application No. 10 2018 213 542.8; 20 pages.

*Primary Examiner* — Rexford N Barnie
*Assistant Examiner* — Xuan Ly
(74) *Attorney, Agent, or Firm* — Maier & Maier, PLLC

(57) ABSTRACT

The disclosure relates to a motor vehicle having an electric drive, wherein the motor vehicle has an HV primary energy storage device to supply energy to the electric drive, wherein the motor vehicle has at least one predetermined mounting area, which is formed such that an HV alternative energy storage device can be mounted in the mounting area and the motor vehicle is formed with an access opening through which the HV alternative energy storage device can be placed in the mounting area and through which an HV alternative energy storage device mounted in the mounting area can be removed from the motor vehicle.

7 Claims, 1 Drawing Sheet

(56) References Cited

FOREIGN PATENT DOCUMENTS

DE 102016217935 * 3/2018
DE 102016217935 A1 3/2018

* cited by examiner

MOTOR VEHICLE WITH AN ELECTRIC DRIVE, HV ALTERNATIVE ENERGY STORAGE DEVICE, AND SYSTEM

FIELD

The disclosure relates to a motor vehicle having an electric drive, wherein the motor vehicle has an HV (high-voltage) primary energy storage device to supply energy to the electric drive. The disclosure also includes an HV alternative energy storage device for such a motor vehicle as well as a system with a motor vehicle and an HV alternative energy storage device.

BACKGROUND

With customary electric and hybrid vehicles, HV batteries, which weigh about 700 kg, are permanently installed in the vehicle and are usually designed as a body-bearing component. According to the current background art, ranges of up to 500 km should be possible. Despite the known quick-charge options for such energy storage devices, a charging process still takes significantly longer, for example, than refueling a conventional motor vehicle operated with an internal combustion engine. Longer distances accordingly become very uncomfortable for a user, because there is no getting around interim charging of the HV battery and the correspondingly long wait times must be expected. On the other hand, designs are known from the prior art which propose replacing the HV energy storage device, for example when it is discharged, with a fully charged HV energy storage device. For example, this is described in the article titled "Traktionsbatterien tauschen statt laden" [*Replacing traction batteries instead of charging*] by Alfred Vollmer, published 11 Jul. 2017 at http://www.all-electronics.de/batterie-tauschsystem-atmo/. Due to the weight and size of typical HV batteries however, the necessary changing stations are technically very complex and expensive and furthermore do not enable any special quick replacement of such an HV battery, which means that similarly long wait times must also be expected in this case. Even with a smaller design of HV batteries however, there is the disadvantage in the event of a replacement that the smaller design of the HV battery, which of course also has effects on a reduced range, also means that the replacement must happen significantly more often such that, even if replacement times are hereby reduced, this advantage, in turn, is canceled out by the necessity of more frequent replacements.

Other disadvantages of previous designs is also that large HV energy storage devices are not efficiently fully utilized over their service life; in particular, the battery capacity is typically only up to about 30% utilization. The daily vehicle usage is up to 20% with an 80% lifetime on average. Thus, a large part of the installed energy storage device is not utilized. In addition, because HV energy storage devices are typically expensive and heavy, they thereby have a negative effect on the total weight of the vehicle as well as on the price of the vehicle. Furthermore, the batteries are typically not upgradable, and costs and resources are also required due to the HV battery bracket as a spare part, and moreover the reserves for battery disposal must be established in advance. Battery replacement in a service visit is laborious and expensive. All of these problems contribute to the fact that the acceptance of electric vehicles has been relatively minimal up to now.

In addition, DE 10 2014 208 186 A1 describes an emergency telephone system, which contains replaceable, universal emergency batteries for electric vehicles. Furthermore, DE 10 2009 007 422 A1 describes a battery mounting device for a motor vehicle having a battery holding device, wherein the battery holding device is designed such that the battery is released into a replacement area under predetermined conditions, for example with an acceleration of the battery caused by an impact, for example in the event of an accident, so that the risk of damage to the battery, particularly to the battery housing, is reduced in the event of an accident.

These devices also cannot overcome the aforementioned problems.

SUMMARY

Thus, the object of the present invention is to provide a motor vehicle having an electric drive, an HV alternative energy storage device, and a system, by means of which the most efficient operation of an electric vehicle and more flexibility are enabled.

Said object is achieved by means of a motor vehicle, by means of an HV alternative energy storage device, and by means of a system having the features according to the respective disclosure.

A motor vehicle according to the invention having an electric drive has an HV primary energy storage device to supply energy to the electric drive. Furthermore, the motor vehicle has at least one predetermined mounting area, which is formed such that an HV alternative energy storage device can be mounted in the mounting area and the motor vehicle is formed with an access opening through which the HV alternative energy storage device can be placed in the mounting area and through which an HV alternative energy storage device mounted in the mounting area can be removed from the motor vehicle.

A motor vehicle with an electric drive in this case can be understood as an electric vehicle driven purely electrically with batteries as well as a hybrid vehicle, for example with an additional combustion engine drive or a further energy supply for the electric drive, for example from a fuel cell. An HV primary energy storage device and an HV alternative energy storage device in this case can be understood, for example, as an HV battery, for example a lithium-ion battery.

A motor vehicle is thus advantageously provided by the invention, which, on one hand, has a permanently integrated HV energy storage device, namely the HV primary energy storage device, and, on the other hand, can accommodate one or more replaceable HV energy storage devices, namely the at least one HV alternative energy storage device. For example, if the motor vehicle is not traveling long distances, it can be supplied with energy solely by the HV energy storage device and no mounting of further HV alternative energy storage devices is necessary, whereby the total weight of the motor vehicle can be enormously reduced with short drives which, in turn, has a positive effect on the energy consumption and on range. In contrast, if a user intends to travel long distances with the motor vehicle, further HV energy storage devices can be added to the energy supply system in a simple manner depending on the distance to be traveled. Thus, the number of HV energy storage devices available in the motor vehicle can very flexibly be adapted to the currently required range. The main advantage of the invention, however, is that an especially simple and quick replacement of the HV alternative energy storage device is made possible by means of the HV alternative energy storage device. Thus, in order to achieve larger distances and in the event that an HV alternative energy storage device is discharged for example, it can easily be replaced with a new one. With such a replacement, thus the entire battery of the motor vehicle does not have to be replaced but rather only an HV alternative energy storage device, for example, can be replaced, which is significantly lighter and smaller as compared to the overall battery assembly and thus also enables a significantly simpler and quicker replacement. In particular, replacement stations or changing stations can be designed that are significantly more economical and less laborious for this purpose. The lower weight and the smaller size of such an HV alternative energy storage device as compared to a total battery mean that a battery changing station can thus be implemented technically more simply and more economically and a battery change, particularly the replacement of an HV battery or an HV alternative energy storage device, is enabled in about three minutes. In addition, the batteries not required can be carefully charged in a charging station and no quick charging that would negatively impact the battery service life is necessary. In addition, the batteries, that is the HV alternative energy storage devices that are currently not being used in the vehicle, can be used in a different way as energy storage devices, for example, in order to optimize the utilization of the power grid and to store any excess energy from the grid, and feed it back into the grid as needed, or generally for applications not related to the motor vehicle. This design also advantageously reduces the costs for a motor vehicle with an electric drive, because only the costs for the HV primary energy storage device permanently integrated into the motor vehicle must be paid during the purchase of the motor vehicle, and the cost for HV alternative energy storage devices would only be applied as necessary, for example in the form of a leasing concept. In addition, the costs for such an HV alternative energy storage device are reduced for a single individual, because it is usable for many other application areas when not being used in the motor vehicle and thus can be used significantly more efficiently. Thus, the costs for such an HV alternative energy storage device can be effectively divided among multiple users.

As a whole, the invention advantageously thus enables short charging times, because a battery replacement option of the HV alternative energy storage device is enabled instead of charging, which takes place significantly more quickly; a need-based increase in range is provided, which can reduce the range anxiety through more flexibility by means of replacement and charging infrastructure; a reduction in costs is enabled by means of battery systems, which are adapted to customer requirements; an enormous weight and cost reduction as a whole can be achieved; the use of existing infrastructure such as dealer networks or fueling stations is possible as well as new usage scenarios in parking garages, with event venues, etc.; a significantly better utilization of resources is enabled by means of the multiuse option of the HV alternative energy storage device with parallel use as an energy storage device; new battery technologies can be incorporated and used with all models; no reserve of specific replacement batteries is required and battery recycling is less laborious and costs are reduced. Thus, the invention enables a significantly more efficient operation of an electric vehicle as well as significantly more flexibility.

The access opening, with which the motor vehicle is formed to place the HV alternative energy storage device in the mounting area, can be formed as a sealable access opening or an open access shaft. In particular, for a respective predetermined mounting area, such an access opening may be provided or an individual access opening, which is assigned to multiple predetermined mounting areas uniformly. Preferably, the battery replacement of the HV alternative energy storage device takes place by means of bottom-side removal of the HV batteries and bottom-side placement of the HV batteries into the at least one mounting area, this means in the area of the underbody, where the optional sealable access opening can also be provided accordingly. However, removal options on the side or from the rear would also be conceivable.

In general, only one individual predetermined mounting area can be provided in the motor vehicle for mounting an individual HV alternative energy storage device. This embodiment is especially advantageous with very small motor vehicles, in which not a lot of installation space is available. Due to the simple replacement option of the HV alternative energy storage device, large ranges can thus be achieved in an especially simple manner even for small vehicles and motor vehicles having very little installation space available for mounting HV energy storage devices.

However, it is especially advantageous when the motor vehicle has multiple predetermined mounting areas for the respective mounting of an HV alternative energy storage device. It is especially advantageous particularly when the motor vehicle has 2 to 3 mounting areas, this means is thus designed for mounting 2 to 3 HV alternative energy storage devices. This offers an especially high degree of flexibility adapted to the range that is intended to be driven at a given point in time. For example, a respective range of about 150 km or more can be provided by the HV primary energy storage device as well as any other HV alternative energy storage devices depending on the development status of battery technology. A total of 450 km can be driven with a total of three energy storage devices, which means, for example, with the HV primary storage device as well as two further HV alternative energy storage devices. The motor vehicle can thus be equipped with HV alternative energy storage devices depending on whether up to 150 km, up to 300 km, or up to 450 km will be driven. On the other hand, when more driving is planned, this is enabled in an especially simple manner by the replacement option of the HV alternative energy storage devices which can be easily replaced, when they are discharged, with a fully charged storage device.

With a further advantageous embodiment of the invention, the at least one predetermined mounting area for mounting an HV alternative energy storage device is formed with a minimum capacity of 10 kWh, especially with a capacity between 20 kWh and 30 kWh. In other words, the mounting area is designed to be sufficiently large enough to mount such type of HV battery with such a minimum capacity. By means of an HV alternative energy storage device with a capacity in a range of 20 kWh to 30 kWh, the aforementioned ranges can be achieved, particularly a range of about 150 km. By incorporating an additional HV alternative energy storage device, an enormous increase in range can thus be achieved and not only, for example, up to the next charging possibility or replacement possibility.

Furthermore, it is also preferable for the HV primary energy storage device to have a capacity of at least 20 kWh, particularly likewise a capacity between 20 kWh and 30 kWh. Thus, distances in a range of 150 km can be provided by the HV primary energy storage device. This modular concept enables especially much flexibility.

In addition, it is especially advantageous when, as is provided according to a further advantageous embodiment of the invention, the HV primary energy storage device is designed such that a maximum capacity, particularly charging and/or discharge capacity, which is at least six times its capacity per hour and especially between six times and ten times its capacity per hour, can be provided by the HV energy storage device. The permanently installed energy storage device can thus provide a higher C-rate (e.g. a C-rate of at least 6 to 10, in order to provide sufficient current to the drive, for example during accelerating, or to recharge, for example during deceleration and recuperating. The replaceable energy storage devices provide a lower C-rate, which is between 2 and 3 for example, in comparison to this. The temperatures in the cells are thereby reduced and significantly less cooling effort is required, which will be addressed in more detail later. In other words, the so-called C-rate of the HV primary energy storage device is preferably between 6 and 10. A C-rate of 1, for example, means that a fully charged energy storage device completely discharges within one hour with a maximum possible discharging current. A C-rate of 2, for example, means that such an energy storage device completely discharges within half an hour with a maximum discharging current. Accordingly, a C-rate of 6 means that a fully charged energy storage device discharges within one-sixth of an hour with the maximum discharging current, and a C-rate of 10 means that a fully charged energy storage device discharges completely within one-tenth of an hour with the maximum possible discharging current. In other words, the higher the C-rate, the higher the maximum possible charging and/or discharging capacity. This is especially advantageous specifically in relation to the HV primary energy storage device because it must be designed to operate the vehicle alone without the presence of additional HV alternative energy storage devices, that is to supply the electric drive of the motor vehicle with energy and particularly also to store recuperation energy. Specifically during deceleration, a lot of recuperation energy occurs within a short time such that a high charging capacity is especially advantageous in order to store this energy efficiently by the HV primary energy storage device. Vice versa, high-capacity requirements can also be covered by the electric drive by means of such a capacity-optimized HV primary energy storage device. The HV alternative energy storage devices, the formation of which will be explained in greater detail subsequently, are preferably not designed to be capacity-optimized in contrast but rather energy-optimized. Because short-term high capacity requirements can already be covered by the HV primary energy storage device, it is especially advantageous because the HV alternative energy storage device can be thus optimized in relation to range. For example, the HV alternative energy storage devices can be accordingly designed with a C-rate between 1 and 3.

Furthermore, it is especially advantageous when a converter device is assigned to a respective HV alternative energy storage device, said converter device being designed to convert the total voltage provided by the HV alternative energy storage device into a definable output voltage. Different voltage levels of the individual batteries, that is of the HV primary energy storage device and of the at least one HV alternative energy storage device, can advantageously be accommodated. Different states of charge of the individual energy storage devices are thereby not reflected in different starting voltages. They can advantageously be compensated for by means of the converter device, which particularly represents a DC/DC converter, which is designed, for example, as an electrically isolated DC/DC converter.

It is especially advantageous in this case when such a converter device is integrated directly into the relevant HV alternative energy storage device, which will be explained in greater detail however subsequently. A converter integrated into the HV alternative energy storage device offers the advantage that the energy storage device can also be connected to another outside of the vehicle in order to be used as an energy storage device for other applications, which will be described more precisely in the following.

Alternatively, it can also be arranged external to the battery. Thus, a further advantageous embodiment of the invention is represented when a converter device is assigned to the at least one predetermined mounting area, to which converter device an HV alternative energy storage device mounted in the mounting area can be connected and which is designed to convert a total voltage provided by the HV alternative energy storage device into a definable output voltage. The HV alternative energy storage devices can thereby be designed significantly more simply and economically. A corresponding converter device, as previously described, that is a DC/DC converter, can thus be provided in the motor vehicle per mounting area, which is provided for precisely one HV alternative energy storage device. If an HV alternative energy storage device is required, it can simply be placed in the mounting area and its positive and/or negative terminals can be connected to the converter device in a simple manner. Thus, advantageous HV alternative energy storage devices can advantageously have different states of charge as relates to one another or as compared to the HV primary energy storage device. Depending on the required capacity, the HV alternative energy storage device can be used, for example, to directly supply the electric motor of the motor vehicle and/or even the HV primary energy storage device.

With a further advantageous embodiment of the invention, the motor vehicle has a cooling device for cooling the HV primary energy storage device, wherein the cooling device has a coupling element, by means of which the cooling device can be coupled to the HV alternative energy storage device mounted in the at least one mounting area, for cooling the HV alternative energy storage device. Thus, in an advantageous manner, the temperatures of the HV alternative energy storage device can also be controlled by means of the cooling system for cooling the HV primary energy storage device, because the HV alternative energy storage device can be connected to said cooling system. It is especially advantageous in this case, for example, when the coupling element is formed for coupling, particularly thermal coupling, with the HV alternative energy storage device as a cooling plate or the like, through which cooling medium, for example a liquid cooling medium or even a gaseous cooling medium, such as $CO_2$, can flow. Upon placement of an HV alternative energy storage device in the mounting area, the contact, particularly mechanical contact, can be accordingly produced between one or more sides of the HV alternative energy storage device and such a cooling device, such as a cooling plate or even multiple cooling plates. Alternatively or in addition, cooling channels may also be integrated into the HV alternative energy storage device itself, for example in its housing, and, by means of the connection devices provided on the HV alternative energy storage devices, the integrated cooling elements of the HV alternative energy storage device can be coupled to the cooling device of the motor vehicle, particularly a cooling circuit, by connecting corresponding lines to these connection elements. It is especially primarily advantageous in this case when cooling is provided in the area of the converter device or even the multiple converter devices. Most of the heat quantity is to be discharged specifically here. A cooling plate or cooling element provided for an HV alternative energy storage device can be arranged in the motor vehicle in this case such that, in the event of an HV alternative energy storage device with integrated converter device mounted properly in the mounting area, the cooling element only extends over a partial area of a contact surface or outer side of the HV alternative energy storage device, particularly over a partial area of a side of the housing of the HV alternative energy storage device, in which area the converter device is also arranged. The cooling device can be especially efficiently designed hereby, because cooling can take place specifically where most of the heat must also be discharged.

The invention further relates as well to an HV alternative energy storage device for a motor vehicle, particularly a motor vehicle according to the invention or one of its embodiments, wherein the HV alternative energy storage device has an integrated converter device, which is designed to convert a total voltage provided by the HV alternative energy storage device into a definable output voltage, which can be provided to an output of the HV alternative energy storage device. The converter device can be formed as a DC/DC converter as described. Advantageously, different voltage levels for the HV primary energy storage device and for the optional further HV alternative energy storage devices can be compensated for by means of the converter device. Thus, the output voltage converted by the converter device is independent of the state of charge of the HV alternative energy storage device. It is then especially advantageous when such a converter device is integrated directly into the HV alternative energy storage device. This provides an additional weight advantage when the HV alternative energy storage device is not required and is removed from the motor vehicle, and the motor vehicle is operated, for example, only on the basis of the HV primary energy storage device. The HV alternative energy storage device can also especially flexibly be used for other purposes, for which a voltage converter may likewise be required.

With a further advantageous embodiment of the invention, the HV alternative energy storage device has a bypass circuit, by means of which the converter device can be bypassed such that the total voltage provided by the HV alternative energy storage device is provided at the output of the HV alternative energy storage device when the converter device is bypassed. In other words, when the converter device is bypassed, which can be provided in a simple manner by the bypass circuit, which may be implemented, for example, as a bypass, the total voltage provided by the battery cells of the HV alternative energy storage device can be accessed directly, that is without conversion by the converter device. This has the significant advantage that with applications, particularly not related to motor vehicles, in which no voltage conversion is necessary, energy can be saved, because a converter device such as, for example, a DC/DC converter, has a certain amount of power loss which can thus be saved.

As previously described, it is further preferable for the HV alternative energy storage device to be formed with a minimum capacity of 10 kWh and preferably a capacity of at least between, and including, 20 kWh and 30 kWh. Such capacities can be implemented according to the current prior art by means of batteries with an acceptable size as relates to the installation space available in the motor vehicle. In the future it is expected that, for example by means of the development of new cell technologies, for example solid batteries, more capacity will be provided with the same amount of installation space and weight by means of such new cells so that a capacity significantly higher than only 30 kWh can be provided for the given installation space of the HV alternative energy storage device and also of the HV primary energy storage device. It is further preferable when the HV alternative energy storage device, which may likewise be formed, as previously described, as an HV battery, for example as a lithium-ion cell battery, has a relatively low C-rate, particularly preferably between 1 and a maximum of 3. A low C-rate is especially advantageous for the use to increase the range in the motor vehicle, because a capacity-optimized battery is already provided, on one hand, by the HV primary energy storage device and the temperatures can additionally be kept as low as possible due to a low C-rate of the HV alternative energy storage device, whereby the cooling of the HV alternative energy storage device is also simplified and can be limited, for example, to areas in which the converter device is integrated into the HV alternative energy storage device.

In addition, the HV alternative energy storage device may be formed as the HV alternative energy storage device described previously in connection with the motor vehicle according to the invention and its embodiments.

Furthermore, the invention also relates to a system with a motor vehicle according to the invention or one of its embodiments, as well as with at least one HV alternative energy storage device. This at least one HV alternative energy storage device is preferably an HV alternative energy storage device according to the invention or represents one of its embodiments.

Accordingly, the advantages mentioned for the motor vehicle according to the invention and its embodiments as well as the advantages described as well for the HV alternative energy storage device according to the invention and its embodiments apply, in the same manner, to the system according to the invention.

BRIEF DESCRIPTION OF THE DRAWINGS

Exemplary embodiments of the invention are described in the following. The following is shown.

DETAILED DESCRIPTION

Figure 1:
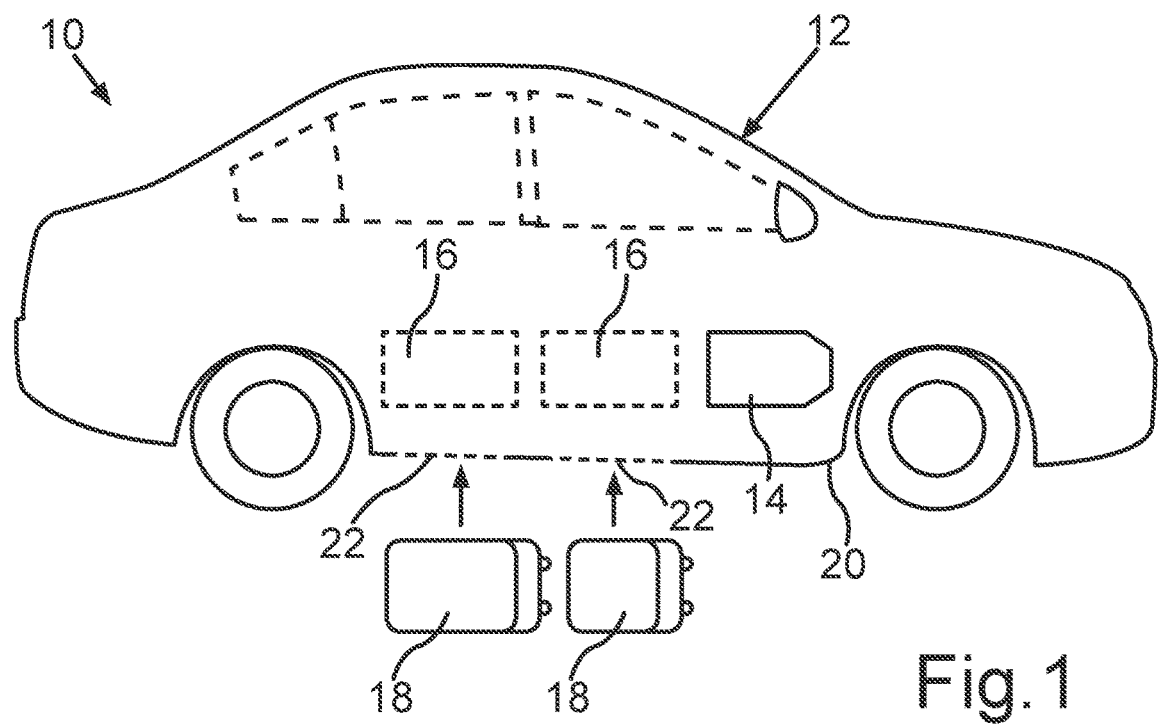
FIG. 1 a schematic representation of a system with a motor vehicle having a high-voltage primary battery and mounting areas for mounting HV replacement batteries according to an exemplary embodiment of the invention.

The exemplary embodiments explained in the following refer to preferred embodiments of the invention. With the exemplary embodiments, the described components of the exemplary embodiments represent individual features to be considered independently of one another, which also further embody the invention independently of one another. Thus, the disclosure should also comprise combinations of the features of the embodiments other than those shown. Furthermore, the described embodiments can also be supplemented through further described features of the invention.

The same reference numerals refer to equivalent features and functions in the figures.

FIG. 1 shows a schematic representation of a system 10 with a motor vehicle 12 according to an exemplary embodiment of the invention. The motor vehicle 12 has an electric drive, which is not shown, as well as an HV primary energy storage device formed as an HV primary battery 14 for supplying energy to the electric drive. Furthermore, the motor vehicle 12 has two predetermined mounting areas 16 in this example, which are formed such that an HV alternative energy storage device formed as an HV replacement battery 18 can be mounted in each of the respective mounting areas 16. In order to enable the easiest-possible placement of said HV replacement batteries 18 in the respective mounting areas 16 and an easiest-possible removal of the HV replacement batteries 18 from the respective mounting areas 16 for their replacement, the motor vehicle 12 may have one or more corresponding access openings 22 preferably on the bottom side, that is in the area of the underbody 20 of the motor vehicle 12, said access openings additionally being formed to be sealable, particularly once the HV replacement batteries 18 have been mounted in the respective mounting areas 16 or removed from them. Depending on the size and the installation space available in the motor vehicle 12, such a motor vehicle 12 may also have more or less such predetermined mounting areas 16. In contrast, the HV primary battery 14 is permanently installed. This means that no simple replacement mechanism or a corresponding opening must be provided in order to remove the HV primary battery 14 easily from the motor vehicle 12. Replacement of this HV primary battery 14 is correspondingly only possible in a workshop or the like. The HV primary battery 14 as well as the HV replacement batteries 18 may comprise multiple individual battery cells, for example in a series and/or parallel circuit. Lithium-ion battery cells are especially suitable for this purpose.

Furthermore, the HV primary battery 14 is preferably designed such that it can provide a maximum-possible discharging and/or charging capacity. In other words, it is preferable when the HV primary battery 14 has a maximum-possible C-rate, preferably a C-rate greater than 5, preferably in a range between 6 and 10. The HV replacement batteries 18 are preferably designed such that they have a lower C-rate than the HV primary battery 14. Preferably, the C-rate of such an HV replacement battery 18 is less than 5, preferably no more than 2, particularly in a range between 1 and 2. This has the significant advantage that high capacities can be provided for the driving operation by the HV primary battery. The optional HV replacement batteries either feed directly to an electric motor allocated to the electric drive or the permanently installed HV primary battery 14 depending on the required capacity. The temperatures of these HV replacement batteries can advantageously be kept particularly low due to the low C-rate of the HV replacement batteries 18.

Because of the fact that the HV primary battery 14 is permanently installed in the motor vehicle 12, it can also be installed as a body-bearing component. On the other hand, the body of the motor vehicle 12 in the area of the replacement batteries, that is in the area of the corresponding mounting areas 16, is designed to be self-supporting, at least when no HV replacement batteries 18 are mounted in the related mounting areas 16. In order to compensate for the lower body stiffness in the area of the mounting areas 16, at least when no HV replacement battery 18 is mounted there, for example dummy structures or an integrated tensioning system, for example with a cable pull, can be provided in the motor vehicle 12 in the area of these mounting areas 16. Such stiffening structures and other structural elements have a significantly lower weight than the HV replacement batteries 18 such that significant weight can be saved with the HV replacement batteries 18 removed despite the provision of these additional structures. If no particularly long range is required for example, the HV replacement batteries 18 can be removed from the motor vehicle 12 or not even used at all, whereby an enormous weight advantage results which, in turn, leads to an increase in range.

Furthermore, it is preferable when the HV replacement batteries have a similar capacity as the HV primary battery 14. Preferably, the capacities of the HV primary battery 14 as well as the respective HV replacement batteries 18 are in a range between 20 and 30 kWh. This enables ranges of about 150 km to be achieved with an average motor vehicle and an average method of driving. As in this example, if an HV primary battery 14 and two optional HV replacement batteries 18 are then mountable in the motor vehicle 12, a range of between 150 and 450 km can be achieved advantageously by modifying the number of the HV replacement batteries 18 mounted in the motor vehicle 12, that is without having to charge the HV primary battery in the interim or without having to charge or replace the HV replacement batteries 18. Due to the replacement option provided simply by the HV replacement batteries 18, the range can be increased in an especially comfortable manner beyond the 450 km in any manner.

By virtue of the fact that the complete energy storage device as a whole does not have to be replaced but instead this concept of replacing the individual HV replaced batteries 18, which are thus correspondingly significantly smaller and lighter than the customary total batteries for electric or hybrid vehicles, enables this separately, a replacement, for example, of such an HV replacement battery 18 can be provided in about three minutes, additionally by a very economical and simply designed changing station.

Figure 2:
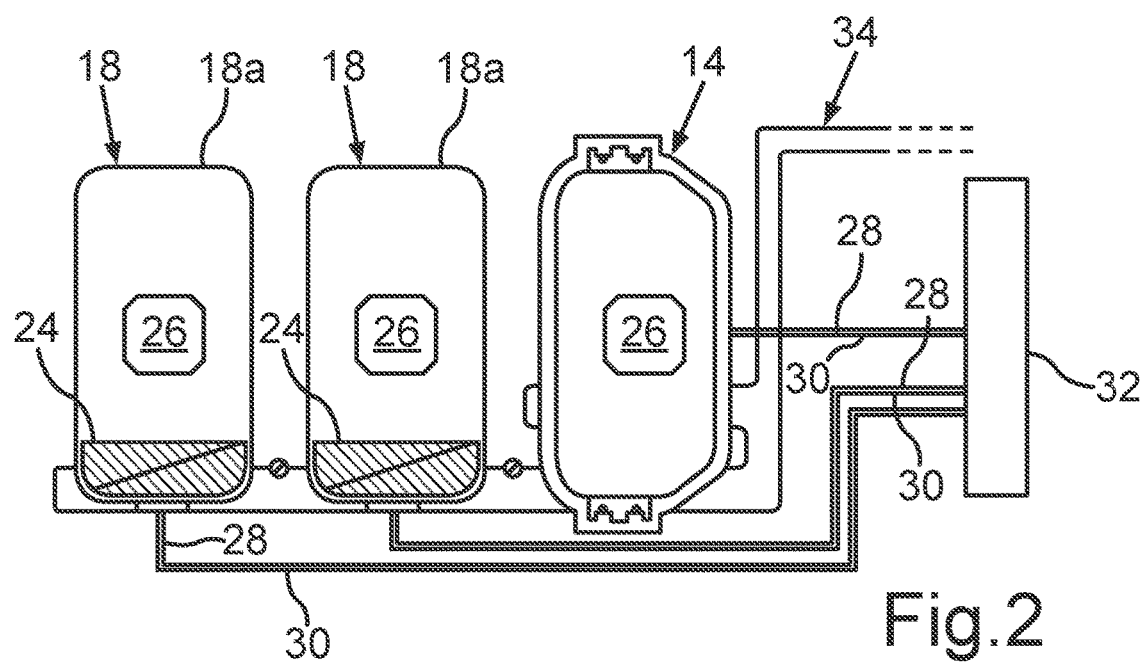
FIG. 2 a schematic representation of an assembly comprising an HV primary battery and two HV replacement batteries for a motor vehicle according to an exemplary embodiment of the invention.

FIG. 2 shows a schematic representation of a battery assembly with an HV primary battery 14 and two HV replacement batteries 18 for a motor vehicle according to an exemplary embodiment of the invention. The HV primary battery 14 and the HV replacement batteries 18 can be formed as described in FIG. 1. A converter device in the form of a DC/DC converter 24 is advantageously integrated into a respective HV replacement battery 18 in this example. Furthermore, the HV replacement battery 18 in this example has a control unit 26 for battery management, it being possible to configure said control unit for typical control tasks in the area of battery management. Such a control unit 26 is also provided for the HV primary battery 14. Due to the integrated DC/DC converter 24, different voltage levels of the batteries, that is of the HV replacement batteries 18 with respect to one another and as relates to the HV primary battery 14, can now advantageously be accommodated. Independently of the current state of charge of the HV replacement batteries 18, the DC/DC converter 24 can thus convert the total voltage provided by the respective HV replacement battery 18 to a predetermined output voltage. The integration of such a DC/DC converter 24 into the HV replacement batteries 18 such that these respective converter devices are thus housed within the particular battery housing 18a of the HV replacement batteries has the significant advantage that also this DC/DC converter 24, these HV replacement batteries 18, when one or more of the removable replacement batteries 18 are not required in the motor vehicle 12, together with the DC/DC converter 24 can be removed from the motor vehicle 12 such that additional weight can be saved here. In addition, it is especially advantageous when the respective HV replacement batteries 18 have a bypass circuit, with which the respective DC/DC converter 24 can be bypassed such that the total voltage that can be provided by the HV replacement battery 18 is accessible directly at the output without a conversion to a predetermined voltage level. This has the significant advantage that the HV replacement batteries 18 can thus be used for other applications, for example not related to the motor vehicle, in which no conversion to a predetermined voltage level is necessary such that, in this case, the DC/DC converter 24 can be bypassed, whereby power losses, which would be caused by the DC/DC converter 24, can be avoided. This advantageously enables operation of the HV replacement batteries 18 that is especially adapted to the situation and efficient.

Furthermore, FIG. 2 shows how the respective poles of the HV replacement batteries 18 as well as those of the HV primary battery 14 are each coupled to power electronics 32 by means of an HV positive line 28 and an HV negative line 30. The power electronics 32 are, in turn, coupled with the electric motor of the motor vehicle 12 and supply it, wherein the electric motor is not shown in this example for reasons of clarity. In order to supply the power electronics 32 with energy, the HV primary battery 14 as well as the one or more HV replacement batteries 18 are arranged in a parallel circuit with respect to one another. Moreover, this also enables, by means of the HV replacement batteries 18 depending on the required power level, either the direct supply of the electric motor by means of the power electronics 32 or even the HV primary battery 14.

Furthermore, the HV replacement batteries 18 are also advantageously connected to a cooling system 34 of the motor vehicle 12 for cooling the HV primary battery 14 in this example. This connection can take place, for example, by means of a cooling plate, through which cooling medium, particularly a liquid or a gaseous cooling medium, can flow. In order to cool the HV replacement batteries 18, these cooling plates can be simply be placed in contact with a part of their housings 18a. Because the HV replacement batteries 18 preferably have a low C-rate, the temperatures of the HV replacement batteries 18, particularly the battery cells thereof, can be kept low such that the cooling effort for cooling these battery cells can almost or even completely be dispensed with. Cooling of the respective HV replacement batteries 18 can be limited, for example, to the area in which the DC/DC converter 24 is arranged, because most of the heat to be discharged occurs here.

As a whole, these examples show how a motor vehicle can be provided with an electric drive as well as HV replacement batteries, which enable a use that is especially flexible and adaptive to the situation, by means of the invention. In particular, the invention or the embodiments thereof enable a "charging" of the energy storage devices of the motor vehicle by replacing one or more of the HV replacement batteries within the briefest of times, particularly in a range of three minutes. Because the HV replacement batteries can be removed from the motor vehicle or mounted in the motor vehicle as needed, a need-based increase in range can advantageously be provided. As a whole, this enables the reduction of costs by means of the battery systems which are adapted to customer requirements, particularly seasonally and regionally, as well as the achievement of enormous weight advantage. In addition, it enables the provision of a uniform battery module for different models, whereby the development and design expense can be minimized. Furthermore, existing infrastructures can be used such as dealer networks, fueling stations, and new usage scenarios can be enabled such as, for example, in parking garages, with event venues, etc. This also enables a significantly better utilization of resources, because the HV replacement batteries can be used in parallel as energy storage devices for applications not related to the motor vehicle. In addition, new battery technologies can be incorporated and used with all models. Thus, advantageously no reserve of specific replacement batteries is required. Because of the fact that when the HV alternative energy storage devices are discharged they can easily be replaced, it is also possible to slowly and carefully charge until the next use and thus to increase their service life. The user further has the advantage that the value of the vehicle is not decreased extensively due to the aging of the HV battery and/or that advantageously the value retention of the vehicle is positive. If the permanently installed HV energy storage device has to be replaced due to aging, etc., this is substantially more economical due to its size.

The invention claimed is:

1. A motor vehicle comprising:
an electric drive, wherein the motor vehicle has an HV primary energy storage device to supply energy to the electric drive, wherein the motor vehicle has at least one predetermined mounting area, which is formed such that an HV energy storage exchanger can be mounted in the mounting area and the motor vehicle is formed with an exchange opening through which the HV energy storage exchanger can be placed in the mounting area and through which the HV energy storage exchanger mounted in the mounting area can be removed from the motor vehicle,
wherein the HV energy storage exchanger has an integrated converter device, which is designed to convert a total voltage provided by the HV energy storage exchanger into a definable output voltage, which can be provided at an output of the HV energy storage exchanger,
wherein the HV energy storage exchanger has a bypass circuit, by means of which the converter device can be bypassed such that the total voltage provided by the HV energy storage exchanger is provided at the output of the HV energy storage exchanger when the converter device is bypassed.

2. The motor vehicle according to claim 1, wherein the motor vehicle has multiple predetermined mounting areas for the respective mounting of an HV energy storage exchanger.

3. The motor vehicle according to claim 1, wherein the at least one predetermined mounting area is formed for mounting an HV energy storage exchanger having a minimum capacity of 10 kWh, particularly with a capacity that is at least 20 kWh to 30 kWh.

4. The motor vehicle according to claim 1, wherein the HV primary energy storage device has a capacity of at least 20 kWh, particularly a capacity that is at least 20 kWh to 30 kWh.

5. The motor vehicle according to claim 1, wherein the HV primary energy storage device is designed such that a maximum capacity, particularly charging and/or discharge capacity, which is between six times and ten times its capacity per hour, can be provided by the HV primary energy storage device.

6. The motor vehicle according to claim 1, wherein a converter device is assigned to the at least one predetermined mounting area, to which converter device an HV energy storage exchanger mounted in the mounting area can be connected and which is designed to convert a total voltage provided by the HV energy storage exchanger into a definable output voltage.

7. The motor vehicle according to claim 1, wherein the motor vehicle has a cooling device for cooling the HV primary energy storage device, wherein the cooling device has a coupling element, by means of which the cooling device can be coupled to the HV energy storage exchanger mounted in the at least one mounting area, for cooling the HV energy storage exchanger.

* * * * *